(12) United States Patent
Bartholomay et al.

(10) Patent No.: US 6,456,595 B1
(45) Date of Patent: Sep. 24, 2002

(54) ALARM INDICATION SIGNAL DETECTION IN THE PRESENCE OF SPECIAL LINE CODES IN DS1 (T1) TELEPHONE CIRCUITS

(75) Inventors: William G. Bartholomay, Orange, CT (US); Santanu Bhattacharya, Delhi (IN); Pushkal Yadav, New Delhi (IN); Balaraj Vishnu Varthanan, Tamil Nadu (IN)

(73) Assignee: Transwitch Corporation, Shelton, CT (US)

( * ) Notice: Subject to any disclaimer, the term of this patent is extended or adjusted under 35 U.S.C. 154(b) by 0 days.

(21) Appl. No.: 09/161,906

(22) Filed: Sep. 28, 1998

(51) Int. Cl.$^7$ ................................................ H04L 1/00
(52) U.S. Cl. ...................................... 370/242; 370/522
(58) Field of Search ................................ 370/241, 242, 370/244, 509, 511, 514, 522

(56) References Cited

U.S. PATENT DOCUMENTS

| | | | |
|---|---|---|---|
| 4,674,088 A | * 3/1985 | Grover | 370/244 |
| 4,740,964 A | * 6/1986 | Stalick | 370/241 |
| 5,408,474 A | * 6/1992 | Wakamori et al. | 370/244 |
| 6,091,712 A | * 7/2000 | Pope et al. | 370/244 |
| 6,167,062 A | * 12/2000 | Hershey et al. | 370/503 |
| 6,282,173 B1 | * 8/2001 | Isonuma et al. | 370/242 |

OTHER PUBLICATIONS

"Requirements for interfacing digital terminal equipment to services employing the extended superframe format" AT&T Tech. Ref 54016, Issue 2, Sep. 1989.
ITU–T Q.921, ISDN User–network interface–data link layer specification, Mar. 1993, 166 pages.
ANSI T1.403.CORE–199x Network and customer installation interfaces–DS1 Electrical Interface, 1995, 72 pages.
ANSI T1.102.01–1996, "Digital Hierarchy VT1.5 Electrical Interface".
ANSI T1.231–1997, "Digital Hierarchy—:Layer 1 in–service digital transmission performance monitoring", 106 pages.
ANSI–T1.403–1997, "Network–to–Customer installation—DS1 Metallic Interface", 65 pages.

* cited by examiner

Primary Examiner—Melvin Marcelo
Assistant Examiner—Ron Abelson
(74) Attorney, Agent, or Firm—David P. Gordon; David S. Jacobson; Thomas A. Gallagher

(57) ABSTRACT

A method and apparatus for reliably detecting both AIS and AIS-CI signals in the presence of a bit error ratio up to $1\times10^{-3}$ includes an AIS detector having an AIS indication output, a CI detector having a CI indication output, and a two signal AND gate having its inputs coupled to the respective outputs of the detectors and having an output indicative of an AIS-CI detection. The AIS detector has an adjustable zero threshold and the CI detector has a threshold output coupled to the AIS detector for adjusting the zero threshold. According to the method of the invention, the AIS detector zero threshold is normally set at the normal threshold ($1\times10^{-3}$) but is reset to a higher threshold (e.g., $2\times10^{-3}$) when the CI detector detects the presence of the CI code word. The AIS signal is detected in a normal way and the AIS-CI signal is detected only when the CI detector detects the presence of the CI code word AND the AIS detector detects the presence of the AIS signal using the higher zero threshold. According to a preferred embodiment, the zero threshold is raised if the CI detector detects two consecutive CI code words, but the CI indication output is indicated only of the CI detector detects eight CI code words in 40 ms. The zero threshold is returned to normal when the CI detector detects ten consecutive absences of the CI code word.

19 Claims, 1 Drawing Sheet

ALARM INDICATION SIGNAL DETECTION IN THE PRESENCE OF SPECIAL LINE CODES IN DS1 (T1) TELEPHONE CIRCUITS

BACKGROUND OF THE INVENTION

1. Field of the Invention

The invention relates to digital telecommunications. More particularly, the invention relates to methods and apparatus for detecting alarm indication signals when such signals are overwritten by other special codes.

2. State of the Art

The first commercial digital voice communications system was installed in 1962 in Chicago, Ill. The system was called "T1" and was based on the time division multiplexing (TDM) of twenty-four telephone calls on two twisted wire pairs. The digital bit rate of the T1 system was 1.544 Mbit/sec (±200 bps), which was, in the nineteen sixties, about the highest data rate that could be supported by a twisted wire pair for a distance of approximately one mile. The cables carrying the T1 signals were buried underground and were accessible via manholes, which were, at that time in Chicago, spaced approximately one mile apart. Thus, analog amplifiers with digital repeaters were conveniently located at intervals of approximately one mile.

The T1 system is still widely used today and forms a basic building block for higher capacity communication systems including T3 which transports twenty-eight T1 signals. The designation T1 was originally coined to describe a particular type of carrier equipment. Today T1 is often used to refer to a carrier system, a data rate, and various multiplexing and framing conventions. While it is more accurate to use the designation "DS1" when referring to the multiplexed digital signal carried by the T1 carrier, the designations DS1 and T1 are often used interchangeably. Today, T1/DS1 systems still have a data rate of 1.544 Mbit/sec and support typically twenty-four voice and/or data DS0 channels. Similarly, the designations DS2 and T2 both refer to a system transporting up to four DS1 signals (96 DS0 channels) and the designations DS3 and T3 both refer to a system transporting up to seven DS2 signals (672 DS0 channels). The timing tolerance for modern T1 equipment has been raised to ±50 bps.

The most recent standardized specifications for T1/DS1 systems are contained in several published standards including ANSI T1.102, ANSI T1.231, ANSI T1.403 and ITU-T Recommendation Q.921, the complete disclosures of which are hereby incorporated herein by reference. It is worth noting that the T1 system is substantially the same in North America and Japan but is different in Europe where it is known as "E1", has a data rate of 2.048 Mbit/sec and multiplexes up to thirty voice and/or data channels.

The current standard for T1/DS1 systems incorporates many improvements and enhancements over the original T1 system. The basic T1 system is based on a frame of 193 bits, i.e. twenty-four 8-bit channels (the payload) and one framing bit (F). According to today's standards, the 192 bit payload need not be "channelized" into 24 DS0 channels. In addition, superframe and extended superframe formats have been defined. The superframe (SF) format is composed of twelve consecutive T1 frames, i.e. approximately 1.5 milliseconds of a T1 signal. In the SF format, the twelve framing bits F are divided into two groups, six terminal framing bits $F_t$ and six signalling framing bits $F_s$. The $F_t$ bits are used to identify frame boundaries and the $F_s$ bits are used to identify superframe boundaries. When the frames are DS0 channelized, the $F_s$ bits are also used to identify signalling frames. The extended superframe (ESF) format is composed of twenty-four consecutive T1 frames, i.e., approximately 3 milliseconds of a T1 signal. In the ESF format, the twenty-four F bits are divided into three groups. Six F bits are used to provide a 2 kbps framing pattern sequence (FPS) which is used to identify the frame and ESF boundaries. When the frames are DS0 channelized, the FPS is to identify signalling frames. Another six of the F bits are used to provide a 2 kbps CRC (cyclic redundancy check-error checking) channel utilizing a CRC-6 code. The remaining twelve F bits are used to provide a 4 kbps data link (DL) channel.

In addition to modern framing conventions, the present T1 specification also includes provisions for different "line codes", sometimes referred to as "transmission codes". It will be appreciated that the T1 signal is a plesiochronous (tightly controlled asynchronous) signal and, unlike a synchronous signal, is still subject to wander, jitter, and slips. Line codes are signalling conventions which are designed to facilitate frame synchronization and error detection. One popular line code is known generally as alternate mark inversion (AMI or bipolar line code). AMI utilizes a ternary signal (positive, negative, and null) to convey binary digits (zero and one). Successive binary ones are represented by signal elements of alternate polarity and of equal magnitude. Binary zeros are represented by signal elements having zero amplitude. Under the AMI line code, a non-zero signal element which follows a non-zero signal element of the same polarity is called a "bipolar violation".

The T1 signal is also conditioned by pulse density requirements, i.e. the minimum number of "ones" (marks or pulses) which must be present in given number of binary digits or "time slots". Pulse density requirements prevent a lost signal from being mistaken for a long string of zero bits. An enhancement to the basic AMI line code which helps meet pulse density requirements is known as "bipolar with 8-zero substitution" (B8ZS). The B8ZS line code provides that blocks of eight consecutive zeros are replaced with a unique eight bit code, i.e. 000VB0VB, where B represents a non-zero signal element conforming to the bipolar rule and V represents a bipolar violation. Another system for meeting pulse density requirements is known as "zero-byte time slot interchange" (ZBTSI). According to ZBTSI, eight consecutive zeros are replaced by an address chain that is decoded by the receiving terminal. As mentioned above, these transmission codes are based on the nature of the T1 carrier and not on the DS1 multiplexing scheme. Today, a DS1 transmission path may be provided on media other than a T1 carrier. A DS1 transmission path which is synchronous (e.g. via SONET) and does not utilize line codes or pulse density requirements is said to have "clear channel capability".

The present standards for SF and ESF formats provide means for sending maintenance signals. Exemplary maintenance signals include Remote Alarm Indication (RAI, or "yellow alarm"), Alarm Indication Signal (AIS), and, more recently, trouble sectionalization signals (RAI-CI and AIS-CI) which identify whether trouble exists at the customer installation (CI) or in the network. Other maintenance signals include loopbacks and loopback control signals. In the SF format maintenance signals are transmitted in-band (in one or more DS0 channels or in a T1 frame). In the ESF format; maintenance signals are transmitted in the DL channel.

The RAI signal is transmitted in the outgoing direction when DS1 terminal equipment located in either the network or the customer installation has effectively lost the incoming signal. The detailed requirements for sending an RAI signal are contained in previously incorporated ANSI T1.231. An RAI is transmitted to the NI in several forms. In the SF format, for the duration of the alarm condition, but for at least one second, bit two in every channel time-slot shall be a zero. In the ESF format, for the duration of the alarm condition, but for at least one second, a repeating 16-bit pattern of eight "ones" followed by eight "zeros" is transmitted continuously on the ESF DL channel, but may be interrupted for a period of 100 milliseconds per interruption for "bit patterned messages". Bit patterned messages are preemptive messages which will overwrite other signals in the DL channel.

The AIS maintenance signal (also known as a blue alarm) is transmitted in place of the normal T1 signal under certain specified conditions such as when an equipment experiences a loss of signal (LOS) at its input or is being placed in a maintenance state such as a loopback. The AIS signal is designed to be readily recognized by all equipment regardless of the framing or line codes employed and may be inserted by the CI or any element in the network. The AIS signal defined in previously incorporated in ANSI T1.231 is a signal having a ones density of 99.9% for a period $\geq T$, where 3 milliseconds$\leq T \leq 75$ ms. The minimum time of 3 milliseconds was chosen so that an AIS which was corrupted by a bit error ratio (BER) of up to $1 \times 10^{-3}$ could be differentiated from a normal (framed) signal having a payload of all ones.

The recently defined trouble sectionalization signals (RAI-CI and AIS-CI) identify whether trouble exists at the customer installation (CI) or the network. More particularly, the RAI-CI signal is a repetitive pattern with a period of 1.08 seconds. It is formed by sequentially interleaving 0.99 seconds of the RAI (ESF) signal with 90 milliseconds of a "bit patterned message", i.e. eight "ones" followed by one "zero", followed by five "ones", followed by two "zeros". The RAI-CI signal may only be used in the ESF format. The AIS-CI signal is a repetitive pattern with a period of 1.26 seconds. It is formed by sequentially interleaving 1.11 seconds of an unframed all ones pattern (the AIS signal) with 0.15 seconds of a modified all ones pattern. The AIS-CI signal is defined as a pattern which recurs at 386 bit intervals in the DS1 signal. In other words, each 386th bit of an AIS signal is overwritten by another repetitive pattern, i.e. eight "ones", followed by two "zeros", followed by five "ones", followed by one "zero". The AIS-CI pattern therefore repeats once every 6176 bits and differs from an ordinary AIS pattern in that bit numbers 3088, 3474, and 5790 are "zeros" rather than "ones". The AIS-CI signal, like the AIS signal, has a ones density greater than 99.9%. The AIS-CI signal may be used in any of the T1 frame formats.

Those skilled in the art will appreciate that the AIS-CI signal is difficult to detect in the presence of line errors. It will be recalled that the AIS signal was designed to be detectable in the presence of a bit error ratio up to $1 \times 10^{-3}$. The AIS-CI pattern modifies the AIS pattern by introducing three zeros every 4 milliseconds (the CI code word) in the AIS pattern. It will be appreciated that AIS detection involves validating the "all-ones density" over a period of three to seventy-five milliseconds before declaring AIS. This is typically done by integrating the number of "zeros" over a period of time and then checking that the number of "zeros" is less than a preset threshold. When the AIS-CI code is present, the additional "zeros" added to the AIS signal may be misinterpreted as indicative of the absence of an AIS signal. If the zero threshold value is adjusted to accommodate the presence of three additional zeros every 4 milliseconds (the CI code word), false AIS indications may result on a noisy line where a framed all ones (non-AIS) signal is present.

SUMMARY OF THE INVENTION

It is therefore an object of the invention to provide a method and apparatus for detecting both AIS and AIS-CI signals in the presence of a bit error ratio up to $1 \times 10^{-3}$.

It is also an object of the invention to provide a method and apparatus for detecting both AIS and AIS-CI signals which reliably detects both AIS and AIS-CI signals in the presence of bit patterned messages which overwrite the signals.

In accord with these objects which will be discussed in detail below, the apparatus of the present invention includes an AIS detector having an AIS indication output, a CI detector having a CI indication output, and a two signal AND gate having its inputs coupled to the respective outputs of the detectors and having an output indicative of an AIS-CI detection. The AIS detector has a zero threshold which is adjustable and the CI detector has a threshold output coupled to the AIS detector for adjusting the zero threshold of the AIS detector. According to the method of the invention, the AIS detector zero threshold is normally set at the normal AIS zero threshold ($1 \times 10^{-3}$) but is reset to a higher threshold (e.g., $2 \times 10^{-3}$) when the CI detector detects the presence of the CI code word. According to the invention, the AIS signal is detected in a normal way and the AIS-CI signal is detected only when the CI detector detects the presence of the CI code word AND the AIS detector detects the presence of the AIS signal using the higher zero threshold. According to the presently preferred embodiment, the zero threshold of the AIS detector is raised if the CI detector detects two consecutive CI code words (i.e., the CI code for 8 ms), but the CI indication output is indicated only if the CI detector detects eight CI code words in 40 ms. According to the presently preferred embodiment, the zero threshold of the AIS detector is returned to normal when the CI detector detects ten consecutive absences of the CI code word (i.e., 40 ms without the CI code).

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
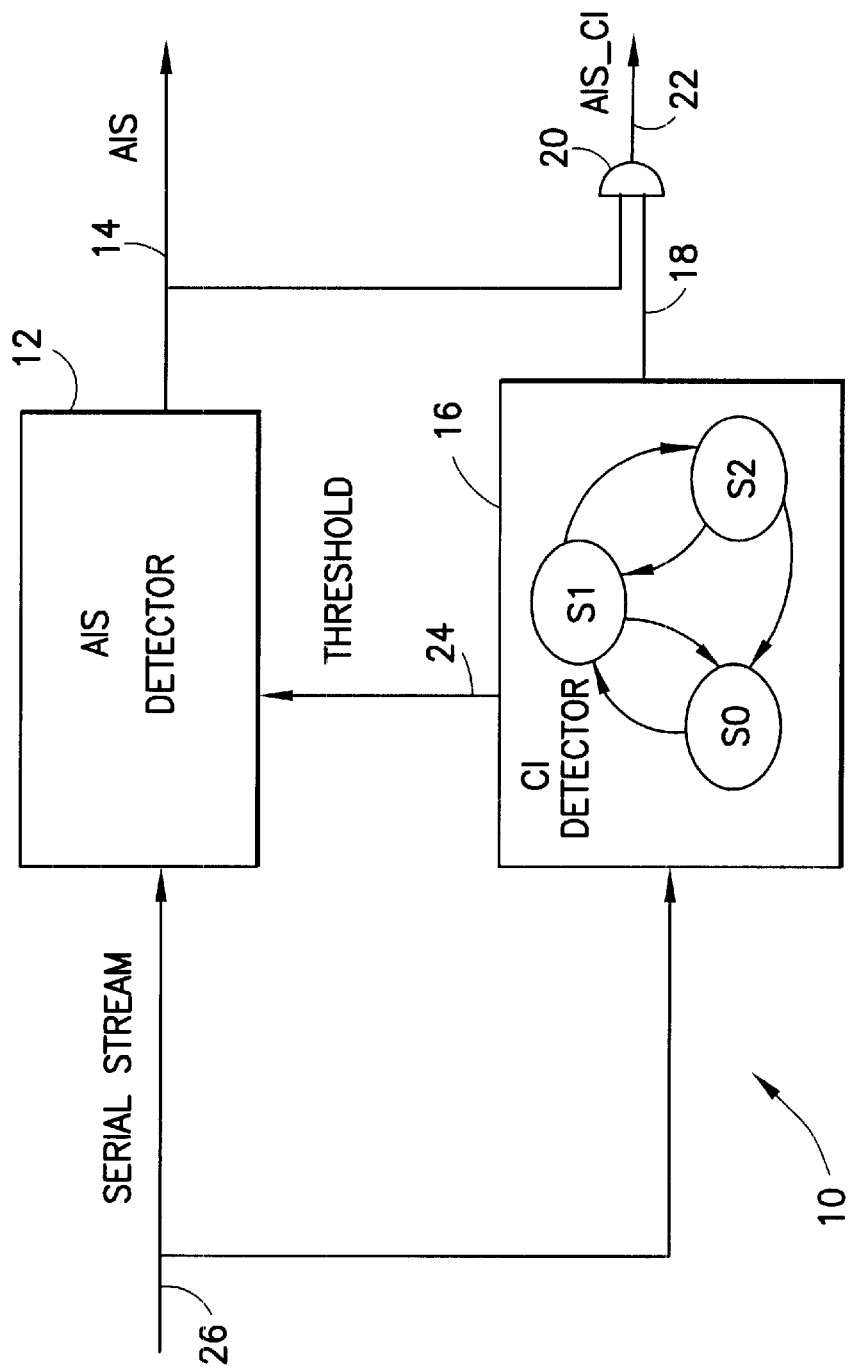
FIG. 1 is a schematic block diagram of the apparatus of the invention.

Referring now to FIG. 1, the AIS and AIS-CI detection system 10 of the present invention includes an AIS detector 12 having an AIS indication output 14, a CI detector 16 having an CI indication output 18, and a two signal AND gate 20 having its inputs coupled to the respective outputs of the detectors and having an output 22 indicative of an AIS-CI detection. The AIS detector 12 is a "zero integrator" with an adjustable zero threshold and the CI detector 16 has a threshold output 24 coupled to the AIS detector 12 for adjusting the zero threshold of the AIS detector 12. Both the AIS detector 12 and the CI detector 16 are coupled to (monitor) the serial data flow 26 of the T1/DS1 signal.

According to the method of the invention, the AIS detector zero threshold is normally set at the normal AIS zero threshold ($1 \times 10^{-3}$). The AIS detector 12 monitors the bit stream 26 and activates its output 14 whenever the number of zeros in the bit stream drops below the threshold. According to the presently preferred embodiment, the AIS detector 12 activates its output 14 when the number of zeros in the bit stream remains below the threshold for approximately 50 ms. This is preferably accomplished with a sliding window detector looking for fourteen or more out of sixteen 3 msec windows having fewer than six zeros. Concurrently, the CI detector 16 monitors the same bit stream and sends a "raise threshold" signal 24 to the AIS detector 12 when the CI code word is seen two consecutive times, i.e twice in approximately 8 ms. The CI detector 16 activates its output 18 when the CI code word is seen eight times in approximately 40 ms. As shown in FIG. 1, the AIS-CI indication is only made when both of the outputs 14, 18 of the AIS detector 12 and the CI detector 16 are active. According to the invention, the zero threshold of the AIS detector is returned to normal by the CI detector 16 when the CI detector detects ten consecutive absences of the CI code word (i.e., 40 ms without the CI code).

As suggested in FIG. 1, the CI detector 16 is advantageously constructed as a state machine which may be implemented in hardware, software, or both. The CI state detector 16 begins operation at state S0 where neither the threshold signal 24 nor the CI detected signal 18 are active. When the CI detector 16 detects two consecutive CI code words, it enters state S1 and sends the "raise threshold" signal 24 to the AIS detector 12. The CI state detector 16 will not return to state S0 from state S1 unless it detects ten consecutive absences of the CI code word (i.e., 40 ms without the CI code). If the CI detector 16 detects eight CI code words within a 40 ms window, while in state S1, it will enter state S2 and activate the CI indicator output 18. From state S2 the CI detector 16 may return to either state S1 or state S0. If the CI detector 16 detects ten consecutive absences of the CI code word (i.e., 40 ms without the CI code), while in the S2 state, it will return directly to the S0 state, deactivating the CI indicator output 18 as well as lowering the zero threshold of the AIS detector 12 via the signal 24. If the CI detector 16 detects fewer than eight CI code words within a 40 ms window, while in state S2, but continues to detect at least one CI code every 40 ms, it will return to state S1 and deactivate the CI indicator output 18.

There have been described and illustrated herein a method and apparatus for reliably detecting both AIS and AIS-CI signals in the presence of a bit error ratio up to $1 \times 10^{-3}$. While a particular embodiment of the invention has been described, it is not intended that the invention be limited thereto, as it is intended that the invention be as broad in scope as the art will allow and that the specification be read likewise. Thus, while particular thresholds and time limits have been shown, it will be recognized that other thresholds and time limits could be used with similar results obtained provided that the objects of the invention are achieved. Moreover, while particular configurations have been disclosed in reference to a state machine, it will be appreciated that other configurations could be used as well. Furthermore, while the apparatus has been disclosed as having an AND gate, it will be understood that different hardware or software can achieve the same or similar function as disclosed herein. It will therefore be appreciated by those skilled in the art that yet other modifications could be made to the provided invention without deviating from its spirit and scope as so claimed.

What is claimed is:

1. An apparatus for detecting AIS and AIS-CI signals in a DS1 data stream, said apparatus comprising:

a) an adjustable threshold AIS detector having a threshold adjustment means for raising its zero error threshold and an AIS indication output, said AIS detector being coupled to the DS1 data stream;

b) a CI code word detector having a first output coupled to said threshold adjustment means and a CI indication output; and c) logical AND means coupled to said AIS indication output and said CI indication output, said logical AND means for providing an indication when said AIS indication output and said CI indication output are both activated.

2. An apparatus according to claim 1, wherein:

said CI code word detector causes said threshold adjustment means to raise the zero error threshold of said AIS detector when a first threshold number of CI code words have been detected within a first threshold time period.

3. An apparatus according to claim 2, wherein:

said first threshold number of CI code words within a first threshold time period is two CI code words within approximately 8 ms of each other.

4. An apparatus according to claim 2, wherein:

said CI code word detector causes said threshold adjustment means to lower the zero error threshold of said AIS detector when no CI code words have been detected within a second threshold time period.

5. An apparatus according to claim 4, wherein:

said second threshold time period is approximately 40 ms.

6. An apparatus according to claim 1, wherein:

said CI code word detector activates said CI indication output when it detects "n" number of CI code words in "x" number of milliseconds.

7. An apparatus according to claim 6, wherein:

"n" is approximately 8 and "x" is approximately 40.

8. An apparatus according to claim 6, wherein:

said CI code word detector deactivates said CI indication output when it detects fewer than "n" number of CI code words in "x" number of milliseconds.

9. An apparatus according to claim 8, wherein:

"n" is approximately 8 and "x" is approximately 40.

10. An apparatus according to claim 9, wherein:

said CI code word detector includes a state machine.

11. An apparatus for detecting a first bit-patterned signal and a second bit-patterned signal which periodically overwrites said first bit-patterned signal in a data stream, said apparatus comprising:

a) an adjustable threshold first bit-patterned signal detector having a threshold adjustment means for changing its detection threshold and a first bit-patterned signal indication output, said first bit-patterned signal detector being coupled to the data stream; and b) a second bit-patterned signal detector having a first output coupled to said threshold adjustment means and a second bit-patterned signal indication output, wherein said second bit-patterned signal detector causes said threshold adjustment means to change the detection threshold of said first bit-patterned signal detector when a first threshold number of second bit-patterned signals have been detected within a first threshold time period.

12. An apparatus according to claim 11, further comprising:

c) logical AND means coupled to said first bit-patterned signal indication output and said second bit-patterned signal indication output, said logical AND means for providing an indication when said first bit-patterned signal indication output and said second bit-patterned signal indication output are both activated.

13. An apparatus according to claim 11, wherein:
said first threshold number within a first threshold time period is two within approximately 8 ms of each other.

14. An apparatus according to claim 11, wherein:
said second bit-patterned signal detector causes said threshold adjustment means to change threshold of when no second bit-patterned signals have been detected within a second threshold time period.

15. An apparatus according to claim 11, wherein:
said second bit-patterned signal detector activates said second bit-patterned signal indication output when it detects "n" number of second bit-patterned signals in "x" number of milliseconds.

16. An apparatus according to claim 15, wherein:
said second bit-patterned signal detector deactivates said second bit-patterned signal indication output when it detects fewer than "n" number of second bit-patterned signals in "x" number of milliseconds.

17. An apparatus according to claim 11, wherein:
said second bit-patterned signal detector includes a state machine.

18. A method for detecting AIS and CI code word signals in a DS1 data stream, said apparatus comprising:
   a) detecting the presence of an AIS signal according to a first threshold;
   b) detecting the presence of a CI code word signal according to a second threshold; and
   c) changing the first threshold to a third threshold when the presence of a CI code word signal is detected.

19. A method according to claim 18, further comprising:
   d) indicating the presence of an AIS-CI signal when said CI code word signal is detected at a fourth threshold and said AIS signal is detected at said third threshold.

* * * * *